United States Patent
Sandgren et al.

(10) Patent No.: US 12,372,603 B2
(45) Date of Patent: Jul. 29, 2025

(54) ESTIMATING A LOCATION OF A USER EQUIPMENT

(71) Applicant: Telefonaktiebolaget LM Ericsson (PUBL), Stockholm (SE)

(72) Inventors: Magnus Sandgren, Staffanstorp (SE); Satyam Dwivedi, Solna (SE); Garry Irvine, Ottawa (CA); Sara Sandberg, Luleå (SE); Alexander Hunt, Tygelsjö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 262 days.

(21) Appl. No.: 18/020,472

(22) PCT Filed: Aug. 13, 2020

(86) PCT No.: PCT/EP2020/072814
§ 371 (c)(1),
(2) Date: Feb. 9, 2023

(87) PCT Pub. No.: WO2022/033695
PCT Pub. Date: Feb. 17, 2022

(65) Prior Publication Data
US 2023/0266425 A1    Aug. 24, 2023

(51) Int. Cl.
*G01S 5/02* (2010.01)
*H04W 64/00* (2009.01)

(52) U.S. Cl.
CPC .......... *G01S 5/0218* (2020.05); *G01S 5/0244* (2020.05); *H04W 64/00* (2013.01)

(58) Field of Classification Search
CPC ..... G01S 5/0218; G01S 5/0244; H04W 64/00

USPC .......................................................... 342/451
See application file for complete search history.

(56) References Cited

U.S. PATENT DOCUMENTS

| 8,634,848 B1 * | 1/2014 | Bozarth | G01S 5/0284 |
| | | | 455/456.1 |
| 9,113,350 B2 | 8/2015 | Militano et al. | |
| 11,947,018 B2 * | 4/2024 | Lennen | G01S 19/426 |
| 2016/0249316 A1 | 8/2016 | Kudekar et al. | |

(Continued)

FOREIGN PATENT DOCUMENTS

| EP | 4014609 B1 * | 11/2023 | ........... G01S 5/0036 |
| WO | WO-2016182964 A1 * | 11/2016 | ............. G01C 21/00 |
| WO | 2020 065384 A1 | 4/2020 | |

OTHER PUBLICATIONS

Xiuling Chen et al., "A Beamforming Method Based on Image Tracking and Positioning in the LOS Scenario", 2017 17th IEEE International Conference on Communication Technology.

(Continued)

*Primary Examiner* — Harry K Liu
(74) *Attorney, Agent, or Firm* — Baker Botts L.L.P.

(57) ABSTRACT

Methods and apparatus are provided. In an example aspect, a method (300, 400, 500) of estimating a location of a User Equipment (UE) is provided. The method comprises determining (302) whether a signal transmitted between the UE and a first network node has a line-of-sight (LoS) path between the UE and the first network node, and estimating (304) the location of the UE based on the signal received at the first network node and based on whether the signal has a LoS path.

16 Claims, 5 Drawing Sheets

(56) References Cited

U.S. PATENT DOCUMENTS

2020/0163040 A1\* 5/2020 Trichopoulos ........ G01S 5/0273

OTHER PUBLICATIONS

John Alred, "This 250° Fisheye Lens Is So Wide It Can Almost See Behind Itself", News Inspiration Reviews Tutorials DIY Gear—Oct. 20, 2016.
PCT Notification of Transmittal of the International Search Report and the Written Opinion of the International Searching Authority, or the Declaration issued for International application No. PCT/EP2020/072814—Jun. 15, 2021.

\* cited by examiner

ESTIMATING A LOCATION OF A USER EQUIPMENT

PRIORITY

This nonprovisional application is a U.S. National Stage Filing under 35 U.S.C. § 371 of International Patent Application Serial No. PCT/EP2020/072814 filed Aug. 13, 2020 and entitled "ESTIMATING A LOCATION OF A USER EQUIPMENT" which is hereby incorporated by reference in its entirety.

TECHNICAL FIELD

Examples of the present disclosure relate to estimation of a location of user equipment (UE), for example based on whether a signal transmitted between the UE and a network node has a line of sight (LoS) path.

BACKGROUND

Figure 1:
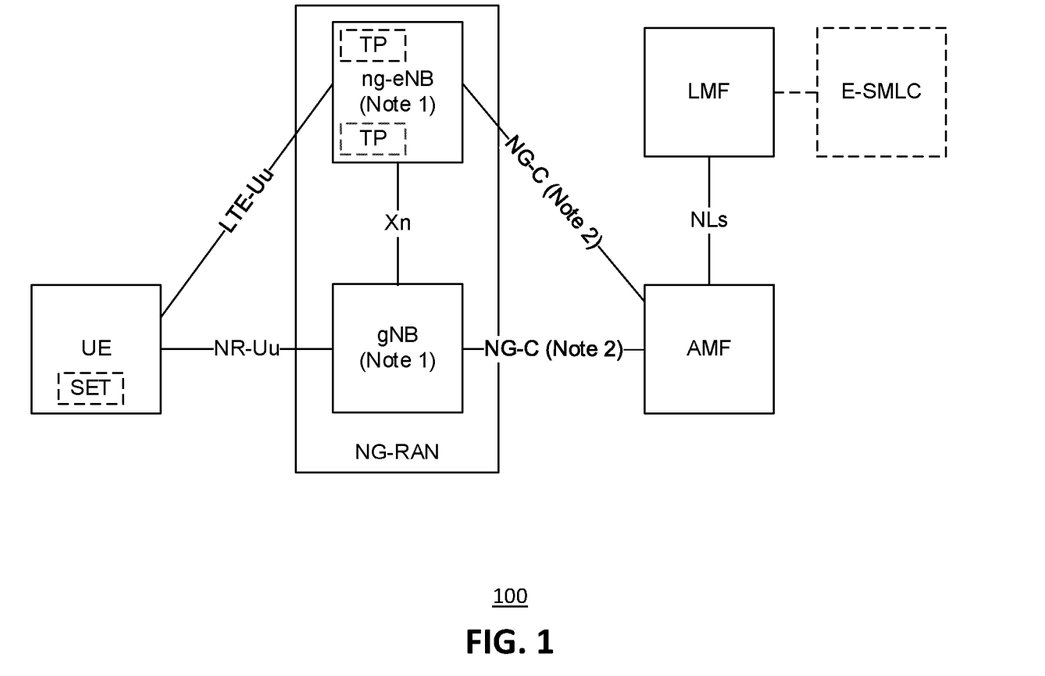
FIG. 1 shows an example of a network architecture for New Radio (NR) that may support device positioning.

In some wireless communications, it may be useful to use the location of a wireless communication device such as a User Equipment (UE) for some purposes. Thus it may be desirable to determine the location of a device. For cellular communication systems for example, device positioning (i.e. determining the location of a device) has been a topic in LTE standardization since 3GPP Release 9. The primary objective is to fulfill regulatory requirements for emergency call positioning. FIG. 1 shows an example of a network architecture 100 for New Radio (NR) that may support device positioning. The Location Management Function (LMF) is the location server in the example architecture shown.

There may also be interactions between the location server and the gNodeB via the NRPPa protocol. Interactions between the gNodeB and the device may be supported by the Radio Resource Control (RRC) protocol.

There are various ways that a device's location or position may be determined. In some examples, nodes in the network use measurements of a reference signal either received by a device (a downlink reference signal), received by the network (uplink reference signal) or both. A positioning algorithm may be deployed over multiple cells involved in the measurements. The device need not be connected to all cells (in the sense that not all cells are serving cells for the device with an RRC connection).

Among the existing solutions, time-based positioning solutions have attracted interest. That is, for example, the time off arrival of a signal at a particular node may be used when determining the location of a device.

SUMMARY

One aspect of the present disclosure provides a method of estimating a location of a User Equipment (UE). The method comprises determining whether a signal transmitted between the UE and a first network node has a line-of-sight (LoS) path between the UE and the first network node. The method also comprises estimating the location of the UE based on the signal transmitted between the UE and the first network node and based on whether the signal has a LoS path.

A further aspect of the present disclosure provides apparatus for estimating a location of a User Equipment (UE), the apparatus comprises a processor and a memory. The memory contains instructions executable by the processor such that the apparatus is operable to determine whether a signal transmitted between the UE and a first network node has a line-of-sight (LoS) path between the UE and the first network node, and estimate the location of the UE based on the signal transmitted between the UE and the first network node and based on whether the signal has a LoS path.

An additional aspect of the present disclosure provides apparatus for estimating a location of a User Equipment (UE). The apparatus is configured to determine whether a signal transmitted between the UE and a first network node has a line-of-sight (LoS) path between the UE and the first network node, and estimate the location of the UE based on the signal transmitted between the UE and the first network node and based on whether the signal has a LoS path.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry.

Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein. Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Line of sight detection may be important for many use cases including wireless positioning (e.g. determining the location of a device). In some cases, only the line of sight component of the signal can be used to estimate the distance between the transmitter and receiver which can be subsequently used in position estimation. The line of sight component of the signal may be the signal that propagates directly from a transmitter to a receiver substantially in a straight line, and not experiencing any reflections along the path. This is in contrast to other signal components that may reflect off objects or surfaces in the environment, and hence have a longer path (in terms of space and time) from the transmitter to the receiver. Additionally, angle-based positioning methods, which use angle of arrival or angle of departure of a signal, may need a line of sight (LoS) path to work correctly. If measurements of a signal transmitted between two nodes that are not in line-of-sight are used for positioning, or if a component of a received signal is used that has not propagated in a LoS manner, this may result in a large positioning error since the path that the signal has taken does not accurately reflect the physical distance between them. However, at present, it is very difficult to estimate whether a signal has LoS from radio signals. In particular, it is difficult to resolve non-LoS components that have propagation delays that are relatively close to that of the LoS component.

Figure 2:
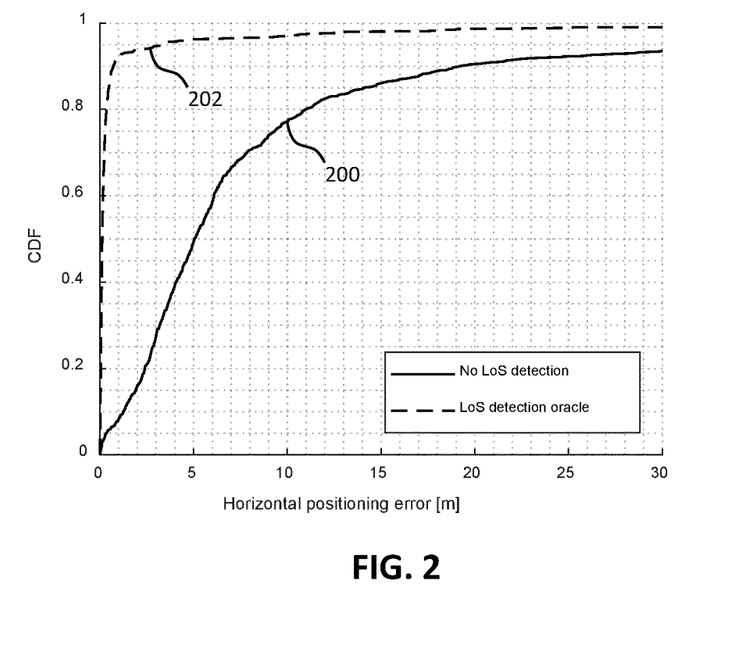
FIG. 2 is an example of a cumulative distribution function (CDF) of simulation results of a horizontal positioning error in a positioning algorithm for a device.

FIG. 2 is an example of a cumulative distribution function (CDF) of simulation results of a horizontal positioning error in a positioning algorithm for a device where the positioning algorithm uses one or more signals transmitted between the device and a network node. The CDF shows two cases, a first case 200 where no line of sight (LoS) detection is used (No LoS detection), and a second case 202 where methods of estimating a location of a device such as a UE as disclosed herein are used. In particular, such methods may for example estimate the location of the device based on a signal transmitted between the device and a network node and based on whether the signal has a LoS path. For the first case 200 where there is no specific line-of-sight (LoS) detection implemented, measurements corresponding to non-LoS paths are also used to determine the UE position which leads to the large positioning errors shown. On the other hand, for example, if the position is estimated based on whether the signal has a LoS path (e.g. only those signal components that have a LoS path are used), it can be seen that the positioning errors are generally much smaller. These example simulations were performed using the 3GPP indoor factory channel model, 100 MHz bandwidth and an inter-site distance between the transmit and receive points (device and network node, in either direction) of 20 meters.

Line of sight (LoS) information can be useful in radio resource optimization and improving positioning accuracy. For example, in device positioning (e.g. estimating the location of a UE), LoS may be used in an algorithm that computes the distance between a base station and a UE based on signals transmitted between the two, or to identify the direction in which the UE is located relative to the base station. LoS detection may for example allow a UE to select base stations to perform signal measurements (e.g. select base stations from/to which signals are transmitted that are used in position estimation), and may therefore reduce the error in position estimation compared to other scenarios that do not consider LoS. Embodiments of this disclosure propose solutions where it is determined whether a signal between a device such as a UE has a LoS path between the UE and a network node (in either direction), and that determination is used in a position or location estimation. In particular, a camera or cameras mounted on one or both of the UE and the network node may be used in the LoS determination. A particular example is summarized as follows.

First, information related to the UE may be retrieved. This information may be for example whether the UE or an associated user is a human, a phone or other wireless communication device, an Automated Guided Vehicle (AGV) or some other type of device. Next, images from one or more cameras mounted on base stations may be processed, the base stations being those that can measure a radio signal used for positioning (in an example where signal(s) transmitted by the UE are used for positioning). This step may for example include object recognition to determine if the UE is in line-of-sight of a particular base station. Next, determined LoS or non-LoS classification may be reported, for example by each base station, to the entity performing the positioning calculation (e.g. a base station, gNB, UE, positioning server or other node). In the positioning calculation, in some examples, only measurements corresponding to those base stations which have LoS to/from may be used in the position estimation.

Figure 3:
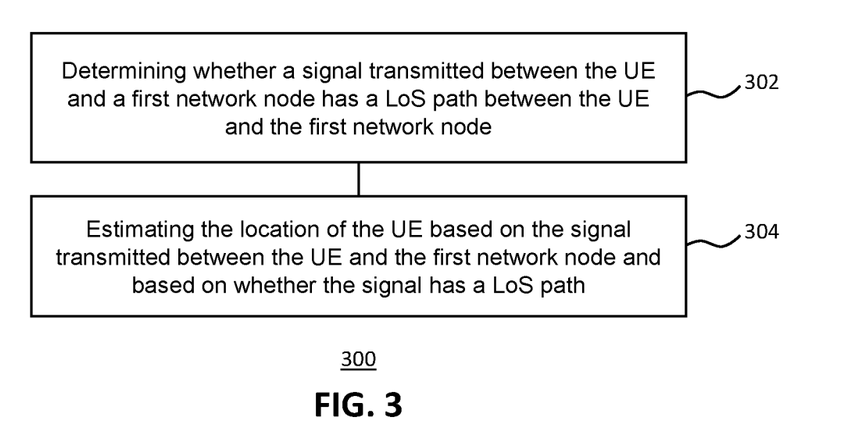
FIG. 3 is a flow chart of an example of a method of estimating a location of a User Equipment (UE)

FIG. 3 is a flow chart of an example of a method 300 of estimating a location of a User Equipment (UE). The method 300 may be performed by the UE, by a first network node, some other network node, a base station, location server or any other node. The method 300 comprises, in step 302, determining whether a signal transmitted between the UE and a first network node has a line-of-sight (LoS) path between the UE and the first network node.

This may comprise for example processing images from one or more cameras mounted on or co-located with the UE and/or the first network node. Alternatively, in some examples, the information as to whether the signal has a LoS path may be received from any other network node, for example a node that processes such images (including the UE or the first network node in some examples). The first network node may be for example a base station such as a gNB or eNB.

Step 304 of the method 300 comprises estimating the location of the UE based on the signal transmitted between the UE and the first network node and based on whether the signal has a LoS path. For example, if it is determined that the signal does not have a LoS path between the first network node and the UE, the signal or any measurements (e.g. time of arrival) related thereto may be disregarded from any location estimation calculation. In such circumstances, the location may be estimated another way (e.g. using measurements of other signals, such as for example those that were determined to have a LoS path between the UE and the first network node and/or other network node(s)).

The LoS information determined in step 302 can be useful in optimizing resources in the network. For example, time and frequency resources may not be spent on a link between a base station (e.g. the first network node) and the UE where the link is not line of sight. This may then reduce interference and power consumption in the network. Additionally or alternatively, LoS information such as that determined in step 302 can reduce the computational complexity of location estimation (e.g. time of arrival algorithms). For example, where multiple signals are measured, the location estimation may take into account measurements of only those signals for which LoS has been determined to or from the UE.

Using cameras as suggested above in some examples for determining whether there is LoS may be more efficient than using radio signals for doing the same detection. For example, at very low frequencies, radio signals may diffract in narrow LoS situations, whereas a camera may still be able to detect the LoS. Hence, camera-based line of sight determination may be independent of the frequency of the signal potentially being used to estimate location.

Therefore, in some examples, the step 302 of determining whether the signal transmitted between the UE and the first network node has a LoS path comprises processing at least one image from a camera. The camera may in some examples be co-located with the first network node. In such examples, determining whether the signal transmitted between the UE and the first network node has a LoS path may comprise determining whether the UE is in the at least one image, e.g. using object recognition.

One area of particular interest for using embodiments of this disclosure may be indoor networks where satellite-based location estimating solutions may encounter problems. Indoor areas for industrial applications, shopping malls and enterprise can have many objects within the environment that may result in frequent situations where there is no line of sight between a UE and a network node. These indoor scenarios could be considered favorable for adding cameras in network nodes such as base stations as they may be in a controlled environment. That is, for example, it may be easier or unnecessary to obtain permission for installation of cameras, and also images and related data that may be considered sensitive could be locally processed within the facility. Furthermore, in embodiments where objects in the vicinity may be determined as explained more fully below, objects within the area may be expected to be a small number of different types and hence object recognition may in some examples use the expectation that there may only be these object types present.

A base station may have an elevated position, e.g. in the roof or high on a wall, meaning it may also have good optical coverage of the surrounding area (e.g. it is above most objects in the vicinity). Further advantages associated with mounting cameras on base stations may include that the required infrastructure in terms of power and communication is already available. The extra cost added by integrating cameras with the base stations may therefore be low. Additionally or alternatively, cameras are included with the majority of smartphones (examples of UEs), and so the cost for using these cameras may be considered low.

In some examples, the method 300 may comprise sending an instruction to the UE to modify its visual appearance. This may comprise for example activation of a blinking LED on the UE or nearby base station, and/or instructing the LED to emit light according to a particular pattern and/or colour, which may be detected in camera images. Determining whether the signal transmitted between the UE and the first network node has a LoS path comprises detecting the modification of the visual appearance of the UE from the at least one image. In other examples, the UE (or the base station) may include a static pattern such as a barcode that may be detected in camera images.

In some examples, determining whether the signal transmitted between the UE and the first network node has a LoS path may comprise detecting objects in the vicinity of the UE and/or the first network node based on the at least one image. For example, if one or more objects are detected that are near the UE and/or the first network node, there is a smaller probability that there is a LoS path.

In some examples, detection and identification of objects in the environment between and around the nodes in the network (i.e. in the vicinity) may be performed, to thereby characterize carrier frequency dependent pathloss caused by such objects, or to identify various paths as possible LoS between the first network node and the UE paths based on received signal characteristics even if visual detection towards object to be positioned is lacking. Different materials in the environment would have various levels of attenuation to the RF carrier frequency. For example, e.g. an identified curtain would prevent visual recognition but still in most cases has low RF attenuation, while a metallic wall would give high RF attenuation. Recognition of materials in the environment (e.g. by visual identification) may in some examples be used to determine whether a signal has line of sight, or give a confidence level, e.g. a signal that may have passed through a curtain may have a higher confidence level for LoS than a signal that appears obscured from LoS by a metal object.

In some examples, processing of the image(s) from camera(s) can identify specific materials and make use of previous measurement characterization to help differentiate LoS from non-LoS scenarios. This may be achieved for example with a look-up table of identified materials and their path loss characteristics. Alternatively, instead of only using a library of a priori material/path loss coefficient characterizations, an operational observation may improve the estimated coefficient value or at least confirm optical identification of the material by matching the measured coefficient to the a priori coefficient. For example, a path loss over the expected distance that substantially matches propagation through free space (or air) as well as a particular material may provide an indication or confirmation that an object is made of that particular material.

The determining in step 302 may in some examples determine a probability or confidence level that is based at least in part on the detection of one or more objects. In some example, the method 300 also comprises repeating the steps of determining whether a signal transmitted between the UE and a first network node has a LoS path after a time period, wherein the time period is based on the detection of one or more objects in the vicinity of the UE and/or the first network node. For example, if there are many objects detected and/or the objects are small, the user may move the UE in an out of a LoS path regularly and hence a shorter time period between repeating step 302 may be advantageous, for example by more often accurately reflecting whether there is a LoS path.

In some examples, the camera is co-located with the UE. Therefore, for example, determining whether the signal transmitted between the UE and the first network node has a LoS path comprises determining whether the first network node is in the at least one image. The UE may also in some examples instruct the first network node to modify its visual appearance in a similar manner as suggested for the UE above.

In some examples, determining whether the signal transmitted between the UE and the first network node has a LoS path comprises detecting at least one object in a vicinity of the UE and/or the first network node from the at least one image from the camera. Determining whether the signal transmitted between the UE and the first network node has a LoS path may in some examples comprise determining a path loss of the signal through the at least one object, and determining whether the signal transmitted between the UE and the first network node has a LoS path between the UE and the first network node based on the path loss. Thus for example if an object in the vicinity of the UE or first network node has a low path loss for the signal, there may be a higher probability that the signal has a LoS path. Herein, in some examples, a LoS path may mean that the signal may propagate directly between the UE and first network node (in either direction) such that the signal can still be detected or measured, and may not necessarily mean that there is a LoS path for optical wavelengths.

In some examples, the method 300 may comprise determining a confidence level for the determination of whether the signal transmitted between the UE and a first network node has a LoS path from the at least one image. This may be based on any of various factors, such as for example detected object(s) in the image, path loss of object(s), and/or other factors. In some examples, determining the confidence level may comprise determining the confidence level to be at least one of: a first confidence level if the UE is identified in the at least one image; a second confidence level if an object of a same type as the UE is identified in the at least one image; a third confidence level if an object with wireless communication capability is identified in the at least one image; a fourth confidence level if an object with a path loss for the signal transmitted between the UE and the first network node that deviates from a free space path loss by a low or substantially zero amount is identified in the at least one image; and a fifth confidence level otherwise. In this example, the first confidence level is the highest confidence level, whereas the fifth confidence level is the lowest.

In some examples, a node other than the node performing the method 300 may determine (e.g. from one or more camera images in a manner as suggested above) that the signal has a LoS path between the UE and the first network node. For example, a base station (or a number of base stations) may determine that a signal between the base station has a LoS path to or from a particular UE, e.g. from camera images, and inform another node performing the method 300 such as a location server whether a signal has a LoS path. In such cases, for example determining whether the signal transmitted between the UE and the first network node has a LoS path may comprise receiving an indication from at least one other network node that indicates whether the signal transmitted between the UE and the first network node has a LoS path between the UE and the first network node. In some examples, the at least one other network node comprises the first network node.

In other cases, for example, collected images may be sent from the UE or first network node (depending on where the camera is located) to the node performing the method 300, whereby the node performing the method 300 may process the image(s) to determine whether there is LoS.

The method 300 may in some examples comprise determining whether the signal or at least one further signal transmitted between the UE and the first network node has a LoS path between the UE and at least one further network node. The method 300 may thus also comprise estimating the location of the UE based additionally on the signal or the at least one further signal and based on whether the signal or the at least one further signal has a LoS path between the UE and the at least one further network node. The location may be estimated from signals that may have LoS paths between the UE and multiple nodes. Thus, for example, estimating the location of the UE may comprise estimating the location of the UE based on signals received at the first network node and/or one or more of the at least one further network node to which it is determined that the signal or the at least one further signal has a LoS path. Alternatively, estimating the location of the UE may comprise estimating the location of the UE based on signals received at the UE from the first network node and/or one or more of the at least one further network node from which it is determined that the signal or the at least one further signal has a LoS path. Where there are multiple nodes, the signal from which the UE's location is estimated may in some examples be the same signal or different signals for the different nodes. Determining whether the signal or the at least one further signal transmitted between the UE and the at least one further network node has a LoS path may for example comprise processing at least one image from at least one respective camera co-located with each of the at least one further network node. For example, determining whether the signal or the at least one further signal transmitted between the UE and the at least one further network node has a LoS path comprises determining whether the UE is in the at least one image from the at least one respective camera co-located with each of the at least one further network node.

Where there are multiple network nodes as indicated above, the method 300 may comprise determining a first estimate of the location of the UE based on the signal transmitted between the UE the first network node and the signal or the at least one further signal transmitted between the UE and the at least one further network node. In some examples, this first estimate may be a "rough" location that does not take into account whether any signals have LoS paths to or from the UE. Then, the method 300 may comprise, for each network node of the first network node and the at least one further network node, selecting a camera of a plurality of cameras co-located with the network node based on the first estimate of the location of the UE. For example, each network node may include multiple cameras with different fields of view. The rough first estimate may be used to select which camera is most likely to include the UE in its field of view. In these examples, determining whether the signal transmitted between the UE and the first network node has a LoS path and determining whether the signal or the at least one further signal transmitted between the UE and the at least one further network node has a LoS path may be based on images from the selected cameras. In some alternative examples, for example combining round trip time (RTT) and angle of arrival (AoA), e.g. in a beamforming based system, the AoA can be used as a first "rough" location. This could be implemented in a single node or in multiple nodes.

Figure 4:
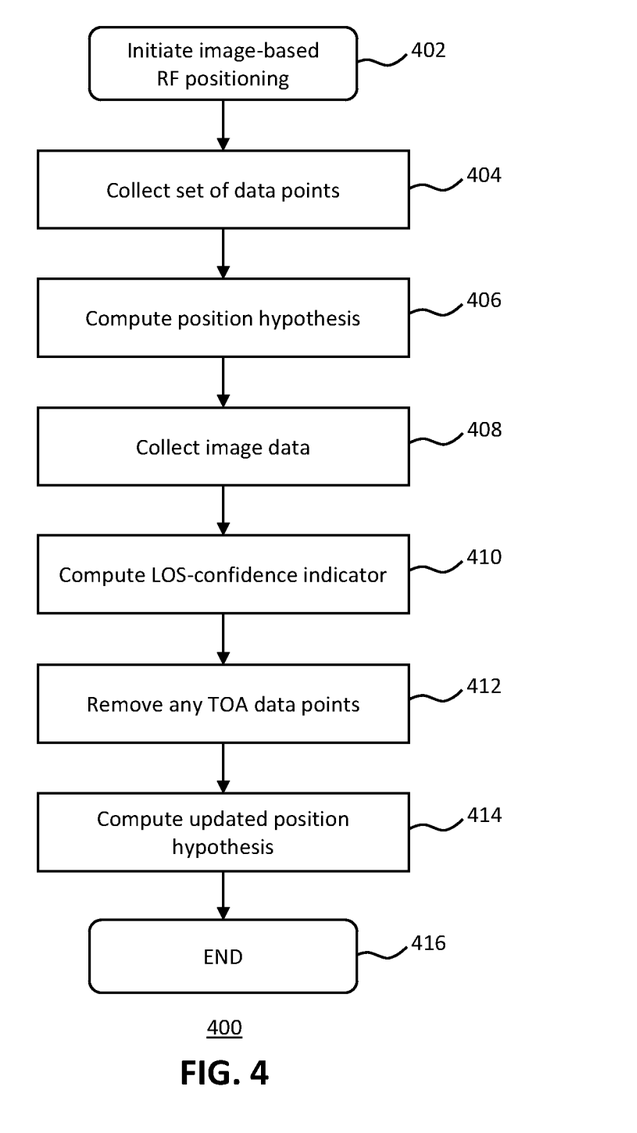
FIG. 4 is a flow chart of an example of another method of estimating a location of a User Equipment (UE)

FIG. 4 is a flow chart of a particular example of a method 400 of estimating a location of a User Equipment (UE). Step 402 of the method 400 comprises initiating image-assisted RF-based 2D positioning. That is, for example, the determined position may be 2D in that a height indication is not included, though a 3D position may be determined in other examples. Step 404 comprises collecting a set of RF-derived time-of-arrival (TOA) data points, $\{TOA_N\}$, from a set of base stations $\{S_N\}$ that have adequate reception quality from a UE transmission. Step 406 comprises computing a position hypothesis p* for the UE using $\{TOA_N\}$ and the coordinates $\{C_N\}$ of each associated base station. $\{C_N\}$ are known a priori. In some examples, p* may correspond to the first "rough" estimate of the location as suggested above.

Step 408 of the method 400 comprises collecting image data $\{IMAGE_N\}$ from the set of base stations, and selecting at each base station one of three cameras with p* in its field of view (FOV) azimuth. The FOV azimuth for each camera at each base station is known a priori. In other examples, each base station may have three cameras or a different number of cameras.

In step 410, a LoS confidence indicator $\{CI_N\}$ for each $\{TOA_N\}$ is computed based on processing of the image data $\{IMAGE_N\}$. Step 412 comprises removing any TOA data points from the set $\{TOA_N\}$ with a low LoS confidence indicator $\{CI_N\}$, yielding a subset of TOA data points {TOA$_K$}, where K≤N. Step 414 of the method 400 comprises computing an updated position hypothesis, p_image-_assisted*, for the UE using data points {TOA$_K$} and the associated base station coordinates {C$_K$}. Thus, for example, the updated position hypothesis may be based on measurements of signals that do not have a low confidence level for a LoS path of the UE transmission from the UE to the respective base station.

Some examples of this disclosure involve mounting multiple cameras on base stations. For example, three cameras, each with a 120 degree horizontal field of view (HFOV), can be mounted to a base station to cover a complete 360 degree of horizontal field of view. For macro base stations, one camera can be mounted so that it covers the same angles as one of the sector antennas. Depending on the requirements of the accuracy of the positioning of the base station other solutions could be used, such as for example one camera with 180 degree of diagonal field of view (DFOV).

In some embodiments, base station installation coordinates will be known and are a prerequisite to any RF positioning solution of a UE. A set of RF position data (e.g. signal time of arrival data) from individual base stations may be used to produce a position hypothesis for a UE. The integrity/accuracy of the position hypothesis depends on an assumption of LoS RF propagation between the UE and the base station. The position hypothesis based on RF position data can be compared against optical detection information in the azimuth of the position hypothesis from each base station contributing RF detection data. Each base station's RF position data can then be assessed for LoS confidence level using the optical detection data. In some examples, optical azimuth (as detected from a camera) can be established as follows:

1. Align optical detection azimuth to physical base station azimuth using one or more of the following methods:
   a. Manually align a physical reference feature on the base station (eg. an arrow painted on the surface of the base station) to point north during base station installation. Associate a deterministic optical azimuth of each camera mounted on the base station relative to the physical reference feature.
   b. Manually measure the direction that a physical reference feature on the base station (eg. an arrow) is pointing during base station installation. Associate a deterministic optical azimuth with the physical reference feature.
   c. In an outdoor environment, detect the solar presence optically and align the camera azimuth.
   d. Associate a physical reference feature on the base station with a sensor of magnetic north.
   e. Use Image recognition to find reference points in the scene with a known position.
2. Align camera detection azimuth directly with RF detection azimuth using one or more of the following methods:
   a. Factory calibrate RF azimuth (eg. beam-pointing or null-pointing) with camera azimuth.
   b. Use knowledge of base station installation coordinates to compute azimuth between base stations a priori. Then coordinate base station to base station RF transmissions/receptions to calibrate receive RF azimuth matching the computed installation coordinates azimuths. Similarly, coordinate LED activity transmissions (eg. a unique signature of LED pulses transmitted at one base station and detected at another base station) to calibrate receive optical azimuth matching the computed installation coordinates azimuths.

The above provides examples of arranging or determining optical azimuth, though any other suitable method may be used.

In some examples, different arrival times for one signal e.g. due to reflections may be detected. It cannot be assumed that the first arriving path is a line of sight path. There are various scenarios for receiving a signal including reflected versions of the signal. These may include for example:
a) There is both a LoS path and a non-LoS path between the first network node (e.g. base station) and the device (e.g. UE). The LoS path is identified as the first peak in the power delay profile (PDP), for example as confirmed using methods as disclosed herein, and arrives earlier than non-LoS paths.
b) There is no LoS path, for example because one or more objects (e.g. metal objects) are located between the base station and the device. The receiver (e.g. base station) may then receive one or more reflected paths. In some examples, the absence of a LoS path may be confirmed (or LoS confidence level may be determined as low) using methods as disclosed herein.
c) There is a LOS path, but it is slightly attenuated after passing through an object, e.g. a curtain or thin wall. The received power from one or more non-LoS paths may be higher than from the LoS path (which may be confirmed using methods disclosed herein in some examples).

The following provides an example of line of sight confidence levels as disclosed above. In this example, the confidence level is referred to as a class, with class A being the highest confidence level and class E being the lowest confidence level. The class may be determined based on what can be identified in camera images.

Class A may be determined when a particular object can be identified, e.g. a specific UE. For example, LoS has been determined not only towards a specific type of object (e.g. a person or particular tool) but also uniquely identifying the object as such a (e.g. a specific person, tool or UE). This could give high confidence but may also require for example high quality object recognition and identification data in an object image data base. This may also require high camera resolutions, more image processing or active actions by the objects e.g. led blinking with specific patterns.

Class B may be determined when an object of a certain type (e.g. person or tool) has been identified, but not necessarily the object that has transmitted or received a particular signal. For example, the actual UE or first network node may be identified in the image or the identified object may be of the same type, with multiple instances of the object of that type identified in the image, or the actual object obscured by another object and hence not fully visible or identifiable. This may be valuable in certain cases, for example where for various reasons detailed information in the database is lacking for unique object recognition, low resolution of camera images, limited image processing capabilities or no possibility for objects to perform active actions such as identifiably modifying visual appearance.

Class C may be determined when any possible object with wireless communication capability is identified in an image. Class D may be determined when there is potential that an object (the UE or first network node) may be hidden visually, e.g. hidden behind a curtain or thin wall, though LoS for a signal between the UE and the first network node may still be possible due to the low RF attenuation of the signal. Class E may be determined when no recognizable object is found. These are examples of classes, and other examples may include a different number of classes and/or different determination requirements.

Some systems may be capable of beamforming, e.g. capable of generating RF signals that propagate substantially in one or more particular directions. In some examples, therefore, it may be possible to evaluate from camera images if certain beam directions and angles between the first network node (e.g. base station) and device (e.g. UE) is unlikely to be a LoS path, e.g. if the beam direction is not expected to propagate towards the other node. Signals using such beams may be excluded from positioning calculations or even excluded from measurements.

Figure 5:
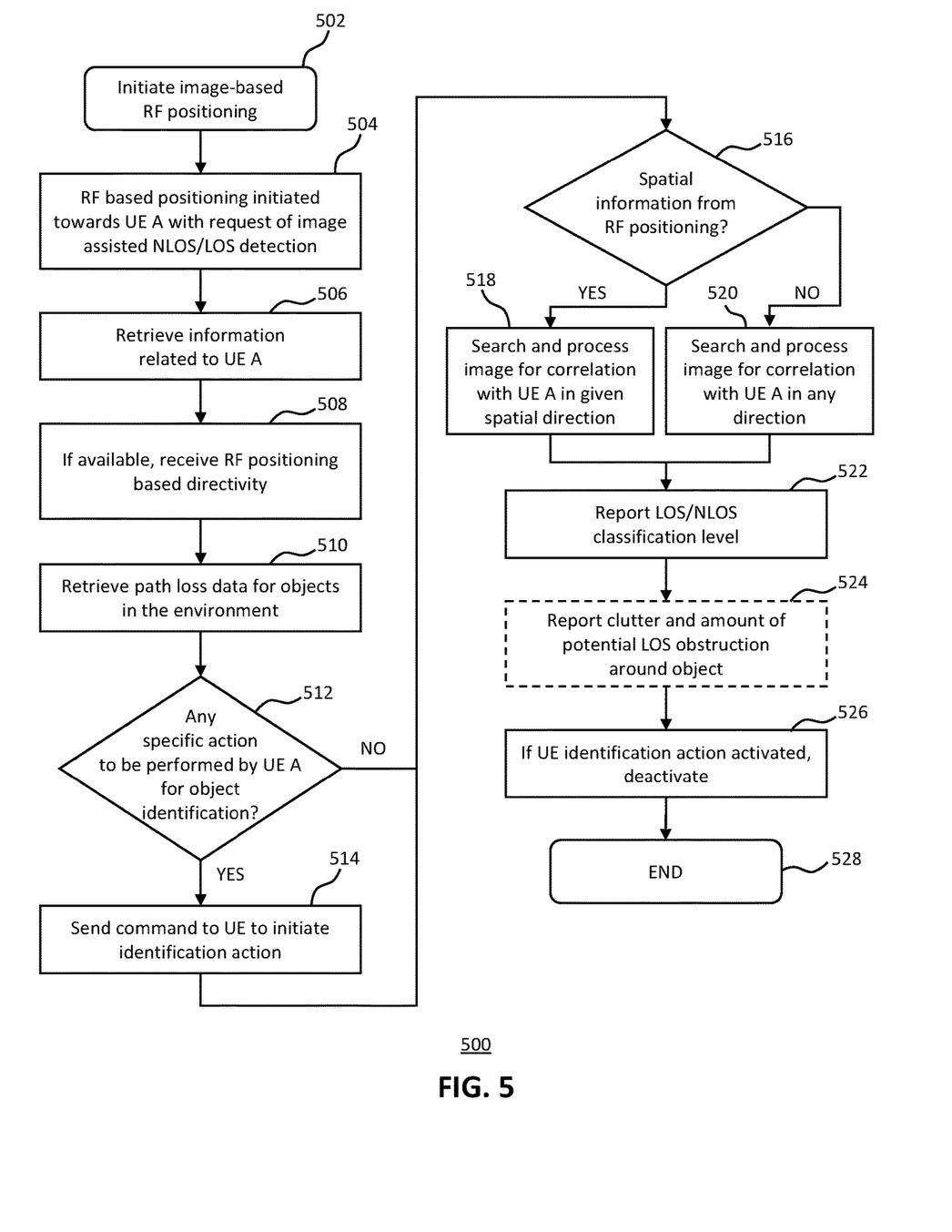
FIG. 5 is a flow chart of a further example of another method of estimating a location of a User Equipment (UE)

FIG. 5 is a flow chart of a further example of another method of estimating a location of a User Equipment (UE). The method 500 may be performed by a node in the network such as for example a base station/access point, a network controller or any other suitable node.

Step 502 of the method 500 comprises initiating image-based RF positioning. The method 500 may provide a 2D or a 3D position for a UE as suggested above. In step 504 of the method, RF based positioning is initiated towards UE A with request of image assisted NLOS/LOS detection. Step 506 comprises retrieving information related to UE A. This may be used for example to map UE A to an object in one or more images. Step 508 of the method 500 comprises receiving (if available) RF positioning based directivity, such as azimuth and elevation for example. Step 510 comprises retrieving path loss data for objects in the environment.

In step 512, it is determined whether any specific action is to be performed by UE A for object identification. For example, the action may be to cause the UE to modify its visual appearance to assist detection or identification in one or more images. If there is such an action to be performed, in step 514, a command is sent to the UE to initiate the action. The method 500 then proceeds to step 516. If there is no such action to be performed, the method 500 proceeds from step 512 to step 516.

In step 516, it is determined whether spatial information from RF positioning is available (e.g. a "rough" location estimate as suggested above). If so, the method proceeds to step 518, where a search for an image and processing of that image (or multiple images) for correlation with UE A in given spatial direction (e.g. the spatial direction of a "rough" location estimate) from a node from which the image is taken is performed. If not, the method proceeds from step 516 to step 520, where a search for an image and processing of that image (or multiple images) for correlation with UE A in any direction, or multiple directions, is performed.

From step 518 or step 520, the method 500 proceeds to step 522, where a line of sight (LOS) or non-line of sight (NLOS) classification level, such as those discussed above, is reported, e.g. to the node requesting RF based positioning in step 504. In step 524, clutter and amount of potential LOS obstruction around object (e.g. the identified UE) is also optionally reported. In step 526, if a UE identification action is performed in step 514, this is deactivated, for example by sending the UE another command (although in other embodiments, the action may expire automatically for example after expiry of a timer). The method 500 then ends in step 528.

Figure 6:
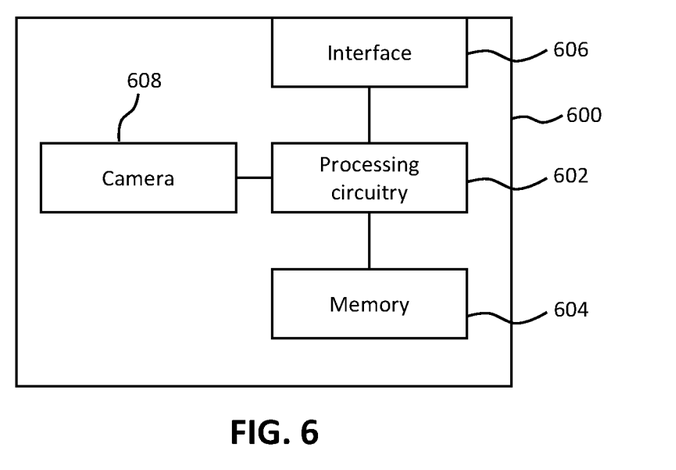
FIG. 6 is a schematic of an example of apparatus for estimating a location of a User Equipment (UE).

FIG. 6 is a schematic of an example of apparatus 600 for estimating a location of a User Equipment (UE). The apparatus 600 comprises processing circuitry 602 (e.g. one or more processors) and a memory 604 in communication with the processing circuitry 602. The memory 604 contains instructions executable by the processing circuitry 602. The apparatus 600 also comprises an interface 606 in communication with the processing circuitry 602. Although the interface 606, processing circuitry 602 and memory 604 are shown connected in series, these may alternatively be interconnected in any other way, for example via a bus. The apparatus 600 may also include a camera 608 for taking images, connected to the processing circuitry 602 (though in other examples the camera may be connected to the interface 606).

In one embodiment, the memory 604 contains instructions executable by the processing circuitry 602 such that the apparatus 600 is operable to determine whether a signal transmitted between the UE and a first network node has a line-of-sight (LoS) path between the UE and the first network node, and estimate the location of the UE based on the signal transmitted between the UE and the first network node and based on whether the signal has a LoS path. In some examples, the apparatus 500 is operable to carry out the method 300 or 400 described above with reference to FIG. 3 or 4.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A method of estimating a location of a User Equipment (UE), the method comprising:
   determining whether a signal transmitted between the UE and a first network node has a line-of-sight (LoS) path between the UE and the first network node, comprising processing at least one image from a camera; and
   estimating the location of the UE based on the signal received at the first network node and based on whether the signal has a LoS path, wherein
   when the camera is co-located with the first network node determining whether the UE is in the at least one image; and
   when the camera is co-located with the UE determining whether the first network node is in the at least one image and selecting to only performing positioning measurements on signals from the first network node when it has a LoS path.

2. The method of claim 1, wherein when the camera is co-located with the first network node sending an instruction to the UE to modify its visual appearance, and wherein determining whether the signal transmitted between the UE and the first network node has a LoS path comprises detecting the modification of the visual appearance of the UE from the at least one image.

3. The method of claim 1, wherein determining whether the signal transmitted between the UE and the first network node has a LoS path comprises detecting objects in the vicinity of the UE and/or the first network node based on the at least one image and repeating the steps of determining whether a signal transmitted between the UE and a first network node has a LoS path after a time period, wherein the time period is based on the detection of one or more objects in the vicinity of the UE and/or the first network node.

4. The method of claim 1, comprising determining a confidence level for the determination of whether the signal transmitted between the UE and a first network node has a LoS path from the at least one image, wherein the confidence level comprises at least one of:
 a first confidence level if the UE is identified in the at least one image;
 a second confidence level if an object of a same type as the UE is identified in the at least one image;
 a third confidence level if an object with wireless communication capability is identified in the at least one image;
 a fourth confidence level if an object with a path loss for the signal transmitted between the UE and the first network node that deviates from a free space path loss by a low or substantially zero amount is identified in the at least one image; and
 a fifth confidence level otherwise.

5. The method of claim 4, comprising receiving the confidence level from another network node.

6. The method of claim 1, wherein when the camera is collocated with the first network node, and the first network node determines that the UE does not have LoS, the first network node does not allocated time and frequency resources for a link between the first network node and the UE.

7. A computer program comprising instructions which, when executed on at least one processor, cause the at least one processor to carry out a method according claim 1.

8. A carrier containing a computer program according to claim 7, wherein the carrier comprises one of an electronic signal, optical signal, radio signal or computer readable storage medium.

9. A computer program product comprising non transitory computer readable media having stored thereon a computer program according to claim 7.

10. A User Equipment, UE, for estimating a location of a User Equipment (UE), the UE comprising a processor and a memory, the memory containing instructions executable by the processor such that the UE is operable to:
 determine whether a signal transmitted between the UE and a first network node has a line-of-sight (LoS) path between the UE and the first network node wherein determining whether the signal transmitted between the UE and the first network node has a LoS path comprises processing at least one image from a camera collocated with the UE, and determining whether the first network node is in the at least one image; and
 estimate the location of the UE based on the signal received at the first network node and based on whether the signal has a LoS path comprising selecting to only performing positioning measurements on signals from the first network node when it has a LoS path.

11. The UE of claim 10, wherein the memory contains instructions executable by the processor such that the UE is operable to:
 when the camera is co-located with the first network node, send an instruction to the UE to modify its visual appearance, and
 wherein determining whether the signal transmitted between the UE and the first network node has a LoS path comprises detecting the modification of the visual appearance of the UE from the at least one image.

12. The UE of claim 10, wherein the memory contains instructions executable by the processor such that the UE is operable to:
 wherein determining whether the signal transmitted between the UE and the first network node has a LoS path comprises detecting objects in the vicinity of the UE and/or the first network node based on the at least one image, and
 repeat the steps of determining whether a signal transmitted between the UE and a first network node has a LoS path after a time period, wherein the time period is based on the detection of one or more objects in the vicinity of the UE and/or the first network node.

13. The UE of claim 10, wherein the memory contains instructions executable by the processor such that the UE is operable to:
 determine a confidence level for the determination of whether the signal transmitted between the UE and a first network node has a LoS path from the at least one image, wherein the confidence level comprises at least one of:
 a first confidence level if the UE is identified in the at least one image;
 a second confidence level if an object of a same type as the UE is identified in the at least one image;
 a third confidence level if an object with wireless communication capability is identified in the at least one image;
 a fourth confidence level if an object with a path loss for the signal transmitted between the UE and the first network node that deviates from a free space path loss by a low or substantially zero amount is identified in the at least one image; and
 a fifth confidence level otherwise.

14. The UE of claim 13, wherein the memory contains instructions executable by the processor such that the UE is operable to:
 receive the confidence level from another network node.

15. The UE of claim 10, wherein when the camera is collocated with the first network node, and the first network node determines that the UE does not have LoS, the first network node does not allocate time and frequency resources for a link between the first network node and the UE.

16. A base station for estimating a location of a User Equipment (UE), the base station comprising a processor and a memory, the memory containing instructions executable by the processor such that the apparatus is operable to:
 determine whether a signal transmitted between the UE and a first network node has a line-of-sight (LoS) path between the UE and the first network node wherein determining whether the signal transmitted between the UE and the first network node has a LoS path comprises processing at least one image from a camera collocated with the base station, and determining whether the UE is in the at least one image; and
 estimate the location of the UE based on the signal received at the first network node and based on whether the signal has a LoS path.

* * * * *